United States Patent
Buch-Rasmussen et al.

(10) Patent No.: US 6,680,091 B2
(45) Date of Patent: *Jan. 20, 2004

(54) MEDICAMENT CONTAINER OF POLYMER OF CYCLIC HYDROCARBON FOR STORING A LIQUID MEDICAMENT

(75) Inventors: Thomas Buch-Rasmussen, Gentofte (DK); Patric Jannasch, Roskilde (DK); Erling Bonne Jørgensen, Veksø (DK)

(73) Assignee: Novo Nordisk A/S, Bagsvaerd (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,519

(22) Filed: Dec. 16, 1997

(65) Prior Publication Data

US 2003/0170410 A1 Sep. 11, 2003

(30) Foreign Application Priority Data

Dec. 23, 1996 (DK) .............................................. 1498/96

(51) Int. Cl.$^7$ ............................................. B29D 22/00
(52) U.S. Cl. ................................... 428/35.7; 428/36.92
(58) Field of Search ............................. 428/35.7, 36.92

(56) References Cited

U.S. PATENT DOCUMENTS

| 5,532,030 | A | * | 7/1996 | Hirose et al. | ............... | 428/35.7 |
| 5,582,957 | A | * | 12/1996 | Sirianni et al. | ............. | 430/347 |
| 5,723,189 | A | * | 3/1998 | Sudo | ........................ | 428/36.9 |
| 5,876,814 | A | * | 3/1999 | Oda et al. | .................. | 428/35.7 |

FOREIGN PATENT DOCUMENTS

| EP | 291 208 | 11/1988 |
| EP | 524 802 | 1/1993 |
| EP | 556 034 | 8/1993 |
| JP | 08-155007 | 6/1996 |
| JP | 08155007 A | * 6/1996 |

OTHER PUBLICATIONS

Chemical Engineering, "Non–reinforced Plastic Combines Strength . . . ", p. 153, Jul. 1996.*
Sucker, Fuchs, and Speiser, "Phamazeutische Technologie," Georg Theime Verlag, 1978, p. 316.
Rote Liste, Arzneimittelverzeichnis, ECV–Editio Cantor, 1995.
Cycloolefincopolymere Topas (COC), Polymere Werkstoffe Hoechst High Chem., Nov. 1995.
Land, H.T. et al., "CD zukünftig aus COC?" Carl Hanser Verlag, 1995, pp. 1048–1054.
Carlowitz, B., "Tabellarische Übersicht die Prüfung von Kunstoffen," Giesel–Verlag für Publizität, 1992.
Patent Abstract of Japan No. JP 8–155007 A (Mitsui Petrochem Ind. Ltd. Daiichi Seiyaku), Jun. 18, 1996.
Patent Abstract of Japan No. JP 7–62028 A (Japan Synthetic Rubber Co. Ltd.), Mar. 7, 1995.
Abstract–JP 8238297 A (Nihon Medi Physics Co LTD), Sep. 17, 1996.
Abstract–JP 8131515 A (terumo Corp.), May 28, 1996.
Tarr et al., American Journal of Hosp. Phar., 48, pp. 2631–2634, (1991).

* cited by examiner

*Primary Examiner*—Sandra M. Nolan
(74) *Attorney, Agent, or Firm*—Reza Green, Esq.; Richard W. Book, Esq.; Marc A. Began, Esq.

(57) ABSTRACT

A medicament container for storing a liquid medicament, such as insulin, comprises a wall with at least two opposite portions made of a polymer material having a light transmission at 400 nm of at least 25%, a glass transition temperature above 50° C., and a density of 0.95 g/cm$^3$ or more. The polymer material comprises at least 70% by weight of a copolymer material composed of aliphatic cyclic or bicyclic hydrocarbons with 5 to 7 membered ring or rings and ethylene or propylene. The container is substantially inert to the medicament and, because it is either transparent or at least includes at least two opposed transparent portions, it is possible visually to inspect the contents of the container to make sure that the medicament has not crystalized or polymerized. The walls of the container provide a good barrier against m-cresol/phenol/benzyl alcohol preservatives and water.

22 Claims, No Drawings

MEDICAMENT CONTAINER OF POLYMER OF CYCLIC HYDROCARBON FOR STORING A LIQUID MEDICAMENT

CROSS-REFERENCE TO RELATED APPLICATIONS

This application claims priority under 35 U.S.C. 119 of Danish application serial no. DK 1498/96 filed Dec. 23, 1996, the contents of which are fully incorporated herein by reference.

The present invention relates to a medicament container for storing a liquid medicament, use of such medicament container, and a medicament container at least partly filled with medicament.

Traditionally, medicament containers for storing liquid medicaments and preparations have been made of glass. For certain medicaments, such as medicaments for peroral administration, containers of opaque polyethylenes or polyesters have also been used. Such a polymer container made of a polyglycolic acid polyester and a terephthalic polyester is e.g. described in U.S. Pat. No. 4,565,851. This container provides a very good barrier against oxygen and other gasses, but it does not provide a sufficient barrier against preservatives and water.

Medicaments, such as insulin or growth hormone, are distributed in small containers or ampoules. Such ampoules normally comprise between 1.5 and 10 ml of ready-to-use medicament. These ampoules are stored in stock, at the hospitals or pharmacies, and with the user. This means that the shelf-life must be sufficiently long. Aqueous solutions or suspensions of medicaments, such as insulin or growth hormones, are normally provided with a preservative, such as phenol and/or benzyl alcohol and/or m-cresol. Addition of preservatives is necessary because a terminal sterilisation is not possible due to the sensitivity of medicaments containing proteins, peptides and/or DNA sequences. Medicaments in containers comprising more than one dose, e.g. for use in pen systems, are at a high risk of contamination. Therefore, preservatives are essential ingredients in such medicaments, in particular in medicaments for parenteral administration. Phenol, benzyl alcohol and m-cresol are approved in small amounts for use in parenteral medicaments, e.g. for intramuscular administration. Aqueous solutions or suspensions of medicaments comprising a preservative may be stored in glass containers for up to 2 years.

The article "Interaction between aqueous preservative solutions and their plastic containers, III" by T. J. McCarthy, Pharm. Weekblad 107 (1972), describes the effects storing certain aqueous solutions of preservatives in containers of polypropylene (PP) coloured with white pearl pigment and poly(vinylchloride) (PVC), respectively, in particular with respect to the loss of preservatives from the solutions. There were no discussions about storing aqueous solutions of preservatives in transparent containers. Further, the conclusion in this article is that large amounts of some types of preservatives are lost from the solutions stored in PP. PVC, however, seems to provide a good barrier against preservatives. As a consequence of its chlorine content, PVC is not acceptable for use due to environmental pollution.

Tarr et al., "Stability and sterility of biosynthetic human insulin stored in plastic insulin syringe for 28 days", American Society of Hospital Pharmacists, vol. 48, pages 2631–34, 1991, describes a similar test of storing aqueous solutions of phenol, benzyl alcohol and m-cresol, respectively, in polypropylene-polyethylene syringes, in particular with respect to the loss of phenol, benzyl alcohol and m-cresol, respectively, from the solutions.

The test covers only 28 days, but from this test it is concluded that the polypropylene-polyethylene syringes cannot be used for storing medicaments comprising phenol and/or benzyl alcohol and/or m-cresol. Insulin or growth hormone containing ampoules are normally stored at refrigerator temperature about 5° C. when stored in stock or at hospitals or pharmacies. When stored with the user, they are often stored at room temperature for up to one month. In particular insulin is stored at room temperature, because the user normally has to carry insulin with him or her all the time. The concentration of insulin and preservative must be close to constant within the storage period. If the concentration of preservative is too low, the medicament will not be sufficiently preserved. It could be suggested to prepare the medicament with a higher initial concentration of preservative. This would, however, not be acceptable for parenteral use. The loss of water should also be very low during the time of storage, because losing a too large amount of water would result in a too high concentration of active medicament, and possibly a too high concentration of preservatives. If too much water is lost, the user may get an overdose of the active medicament, such as insulin.

Further, it is important that the user can visually inspect the medicament to make sure that the medicament is not crystallised or polymerised due to e.g. self association or denaturation, or that any other visually detectable change of the medicament has occurred, such as oxidation of the active medicament.

The object of the present invention is to provide a medicament container of a polymer material, which material is substantially inert to the medicament, and which container is transparent and provides a good barrier against m-cresol/phenol/benzyl alcohol and water, respectively.

Another object of the invention is to provide a medicament container, which is cheap and easy to produce.

Yet another object of the invention is to provide a medicament container for long-time storage of aqueous medicaments, such as aqueous solutions of insulin or human growth hormone.

The medicament containers according to the present invention for storing a liquid medicament comprising one or more active medicaments, water and m-cresol and/or phenol and/or benzyl alcohol, comprises a distal and a proximal end portion and a wall, at least two portions of the wall herein also referred to as wall sections, being of a polymer material. These polymer wall portions have a thickness of between 0.3 mm and 3 mm, preferably between 0.5 mm and 1 mm, a light transmission at 400 nm of 25% or more, measured through both of the opposite container wall portions when the container is filled with water, using a standard spectrophotometer and air as reference, and the polymer wall portions being of a material comprising at least 70% by weight of a copolymer material composed of aliphatic cyclic or bicylic hydrocarbons with 5 to 7 membered ring or rings and ethylene or propylene, the material having a glass transition temperature above 50° C., measured by differential scanning calorimetry, by cutting pieces from the container walls and heating them in an aluminium pan from 10° C. to 270° C. at a scanning rate of 10° C./min, the glass transition temperature being determined as the temperature at the inflection point, and a density of 0.95 g/cm$^3$ or more.

The material may comprise up to 5% by weight of additives in particular selected from antioxidants, lubricants such as stearates and silicones, surface active agents, nucleating and clarifying agents, and up to 30% by weight of inert fillers, such as glass particles having a refractive index about equal to the refractive index of the polymer material, the total amount of additives and fillers being up to 30% by weight.

As explained above, the scattering and absorbence of visible light of the material must be low in order to control the quality of the medicament in the container. Quality control can be a visual inspection for foreign particles, homogeneity of a suspension, sedimentation of crystals, precipitation in solutions, fibrillation or polymerisation of peptides or proteins in solutions, and changes in the absorbance spectrum of the medicament solution.

Most critical are changes which affect the concentration of the active medicament or drug in the solution, and of these, a polymerisation or a precipitation can be very difficult for a user to observe, especially if the container has a low light transmission.

For some insulin formulations, it is important that a diabetic patient can visually observe if more than 3% of the insulin are polymerised. The polymerised insulin can visually and with a spectrophotometer be observed as a change in light transmission. The typical change in transmission from an insulin solution where 3% of the insulin are polymerised, corresponds to the transmission change in a 1:400 Ph.Eur standard and a typical change in transmission from an insulin solution where 30% of the insulin are polymerised, corresponds to the transmission change in 1:40 Ph.Eur standard. (1997 European Pharmacopeia section 2.2 Physical and Physicochemical Methods. 2.2.1 Clearity and Degree of Opalescence of Liquids.)

In a glass container, the transmission typically changes from about 94% to about 45% with a 1:40 Ph Eur at 400 nm and 0.9 mm wall thickness. In an amorphous cyclic polyolefin, the transmission typically changes from about 85% to about 41% with a 1:40 Ph.Eur, changes visually perceivable by eye. In highly transparent polypropylene, the transmission typically changes from about 40% to about 18%. In a less transparent polypropylene, the transmission typically changes from about 15% to about 6%, or even from about 4% to about 3%, all changes being determined using a 1:40 Ph.Eur.

It is obvious that the patient has the best possibility of observing such a problem in a medicament container where the transmission is high, and where the changes are large. In practice, the transmission in a 3 ml container with a wall thickness of 0.9 mm and filled with a commercial insulin solution, such as Actrapid 100 IU/ml (Novo Nordisk A/S), is recommended to be higher than 25% at 400 nm in order to be able to visually observe a polymerisation larger than 3%.

A few suitable materials for packaging parenteral drugs preserved with m-cresol have surprisingly been found among the group of polyolefin materials. As explained above, any material must fulfil a number of specifications to be able to prevent m-cresol and water from disappearing from the drug formulation, and to be able to allow visual inspection of the product quality.

The medicament containers of the present invention should preferably meet the following requirements:

The polymer wall portions have a permeability of m-cresol of less than 0.0072 $g/m^2/24$ hours, measured after a storing period of three months at 37° C. and 12% relative humidity (RH) by contacting the polymer wall with an aqueous 3 mg/ml m-cresol solution, and a permeability of water of less than 0.4 $g/m^2/24$ hours, measured after a storing period of three months at 37° C. and 12% RH, more preferably the polymer wall portions have a permeability of m-cresol of less than 0.0055 $g/m^2/24$ hours, and even more preferably less than 0.0020 $g/m^2/24$ hours, measured after a storing period of three months at 37° C. and 12% RH by contacting the polymer wall with an aqueous 3 mg/ml m-cresol solution, and preferably the polymer wall portions have a permeability of water of less than 0.35 $g/m^2/24$ hours, more preferably less than 0.30 g/m/24 hours, and even more preferably less than 0.20 $g/m^2/24$ hours, measured after a storing period of three months at 37° C. and 12% RH.

Preferably, the polymer wall portions have a permeability of water of less than 0.025 $g/m^2/24$ hours, measured after a storing period of three months at 8° C. and 13% RH for 36 months, more preferably less than 0.021 $g/m^2/24$ hours.

M-cresol, benzyl alcohol and phenol are all organic solvents with very low solubility in water. M-cresol is less polar than phenol and benzyl alcohol and will therefore diffuse faster than phenol and benzyl alcohol in a very hydrophobic environment. Further, the solubility of m-cresol will be higher in a hydrophobic environment such as a cyclic polymer. Even though phenol and benzyl alcohol are smaller molecules than m-cresol and that the size can be important for the diffusion rate, it has been found that the loss of phenol or benzyl alcohol will be smaller than the loss of m-cresol, and it is therefore sufficient to determine the loss of m-cresol.

According the present invention it is even more preferred that the medicament container, in particular for parenteral drug applications, meet the following requirements:

The loss of water should be less than 1.5% after storage at 37° C. and 12% RH for 3 months and be less than 1% after storage at 8° C. and 13% RH for 36 months. For a 3 ml container with an inner diameter of 9.25 mm, this corresponds to a permeability at 37° C. of about 0.35 $g/m^2/24$ hours and at 8° C. of about 0.021 $g/m^2/24$ hours.

The loss of m-cresol should be less than 10% for the whole container, and preferably 7.5% for the polymer wall portions of the container after storage at 37° C. and 12% RH for 3 months. For a 3 ml container with an inner diameter of 9.25 mm and a wall thickness of 0.9 mm, this corresponds to a permeability of about 0.0053 $g/m^2/24$ hours.

According to the invention, a group of polymer containers have been found to meet the specification, namely the containers comprising amorphous polymers composed of aliphatic cyclic or bicylic hydrocarbons with 5 to 7 membered ring or rings and ethylene or propylene, the material having a glass transition temperature above 50° C., measured by differential scanning calorimetry, by cutting pieces from the container walls and heating them in an aluminium pan from 10° C. to 270° C. at a scanning rate of 10° C./min, the glass transition temperature being determined as the temperature at the inflection point; and a density of 0.95 $g/cm^3$ or more.

The amorphous copolymer material is preferably composed of aliphatic cyclic hydrocarbons with 5 to 7 membered ring or rings and ethylene, and preferably the copolymer material is completely amorphous, say it has a crystallinity of less than 1% by weight. Most preferably, the amorphous copolymer material is of the type sold under the trademark "Topas", marketed by Schott and Hoechst(see table 1).

Also, it is preferred that the amorphous polymer wall portions of the container according to the invention have a light transmission at 400 nm of 60% or more, and more preferably a light transmission at 400 nm of 75% or more, measured as specified above.

The density of the amorphous polymer wall portions of the container according to the invention is preferably between 0.95 $g/cm^3$ and 1.05 $g/cm^3$, more preferably about 1.02 $g/cm^3$.

The glass transition temperature (Tg) is preferably at least 75° C., and more preferably at least 100° C., measured as specified above. Water steam sterilisation is available for sterilisation of the containers having Tg's above these temperatures. For containers of polymers having lower Tg's gamma sterilisation is useful.

Generally, the higher the ratio of cyclic components to linear components in the copolymer the higher the Tg of the polymer. The water barrier properties are correlated to the content of the cyclic component in the polymer, in that the water barrier is increased by lowering the amount of cyclic component relative to linear component until a certain degree. Preferably the polymer material comprises at least 20% linear olefin, preferably at least 50% linear olefin, such as ethylene.

Accordingly, the glass transition temperature is preferably at most 200° C., such as at most 170° C., more preferably at most 150° C.

The amorphous polymer preferably comprises at least 75%, more preferably more than 95%, and most preferably 98% by weight or more of a polyolefin material.

The remainder of the material may preferably be up to 5% by weight of additives, in particular selected from antioxidants, lubricants, such as stearates and silicones, surface active agents, nucleating and clarifying agents, and inert fillers, such as glass particles having a refractive index about equal to the refractive index of the polymer material, the total amount of additives and fillers being up to 30% by weight.

The container according to the invention having polymer wall portions of amorphous polymer material, may have any suitable shape. It is preferred that the inner surface of the wall, and preferably also the outer surface of the wall of the container, has a substantially cylindrical shape, because if a flexible rubber piston is rotated a few degrees in the container, it can only keep its tightening effect if at least the inner surface of the container has a substantially cylindrical shape.

The container may preferably be a cartridge, the distal end portion comprising a pierceable seal, and the proximal end portion comprising a plunger. Such cartridges are known in the art.

The polymer wall portions preferably constitute at least 30%, preferably more than 50%, and more preferably more than 80% of the area of the wall.

The container may have thicker and thinner wall parts. An improved transmission may be obtained by decreasing the thickness of one or more parts of the container wall. This will obviously affect the barrier properties in these parts. Improved barrier properties of the container may be obtained by increasing the thickness of one or more parts of the container wall.

In a preferred embodiment according to the invention, the container is a cartridge having a polymer wall with a cylindrical inner side, and a distal end portion comprising a pierceable seal, and a proximal end portion comprising a plunger, the wall having a varying thickness so as to provide a very transparent window.

The wall of the container may preferably be made by injection moulding, in particular if the main part or all of the wall is made from polymer material.

The invention also relates to the use of the containers for storing a medicament comprising one or more preservatives. The medicament is preferably an aqueous solution or suspension of human growth hormones, or an aqueous insulin solution or insulin suspension, preferably comprising between 25 and 600 IU of insulin, between 0.1 and 5 mg of phenol or benzyl alcohol, and between 0.5 and 5 mg of m-cresol per ml medicament.

In the examples, the following methods of determining the properties of the materials have been used:

Permeability

The materials were moulded into 3 ml containers with an outer diameter of 11.05 mm, an inner diameter of 9.25 mm, and thus a wall thickness of 0.90 mm. The containers were closed with a bromobutyl rubber stopper in one end and a bromobutyl/natural rubber laminate in the other end.

The permeability of m-cresol was measured after storage of the container with insulin (Actrapid, 100U/ml, Novo Nordisk A/S) at 37° C., 13% relative humidity (RH) for 3 months.

The permeability of water was measured after storage of the container with insulin formulation (Actrapid, 100 IU/ml, Novo Nordisk A/S) at 37° C., 13% RH for 3 months and at 8° C, 13% RH for 6, 12 and 18 months.

M-cresol Permeability

The m-cresol loss was measured after a storing period of three month at 37° C., with a HPLC size-exclusion method using isocratic elution with a mobile phase, on a Waters Protein-Pak I-125 column, with the following composition: 600 g of glacial acetic acid, 600 g of acetonitrile, 2.8 g of L-arginine and water added to 4000 g. Frozen standards were used to correct for drift in the HPLC system. Glass containers with the same dimensions as the plastic containers were used to correct for losses through the rubber stopper and the rubber closure. The permeability was calculated.

Water Permeability

The water permeability was measured as a weight loss after the test period of 3, 6 and 18 months. The loss was linear with time in the test period and the results can therefore be extrapolated to 36 months at 8° C. Glass containers with the same dimensions were used as reference.

Transmission

The transmission was measured with a standard spectrophotometer, using air as reference. The container was placed with the light beam perpendicularly to the plastic surface, so that the light beam passed through the container wall, through the water solution or water contained therein, and out through the opposite container wall into the detector. In this setup, the light passes through the double wall thickness. The diameter of the light beam was kept small, as compared with the diameter of the container, to avoid reflection on the container surface.

Density

The densities of the plastic materials were determined by measuring the volumetric change of an aqueous solution, containing a detergent, when adding a known weight of the plastic to the liquid.

Ethylene Content

Ethylene content may be measured using proton NMR.

Glass Transition Temperature

The glass transition temperature of the cyclic polyolefin materials was evaluated by differential scanning calorimetry, DSC. Samples were cut from the containers and put into aluminium pans. The samples were subsequently heated from 10° C. to 270° C. at a scanning rate of 10° C./min. The glass transition temperature was evaluated as the temperature at the inflection point on the step in heat flow which was associated with the glass transition of the material.

Materials

In the examples, the materials of table 1 were used.

TABLE 1

| Materials used Cyclic olefins: | Distributor | Development Sample (Yes/No) | Used in example No |
|---|---|---|---|
| Schott Topas ® 8007 | Hoechst, Denmark | No | 1 |
| Schott Topas ® 5013 | Schott, Denmark | No | 1 |
| Schott Topas ® 6013 | Schott, Denmark | Yes | 1 |
| Schott Topas ® 6015 | Hoechst, Denmark | No | 1 |
| Schott Topas ® 6017 | Hoechst, Denmark | No | 1 |
| Daikyo CZ-resin | Daikyo | Yes | 1 |

The developmental materials were received from the companies as: not commercially available transparent materials, under development for later marked introduction. The developmentals material are therefore not commercially available as such, but may be obtained from the distributor on request.

EXAMPLE 1

Containers of 4 different cyclic polyolefins (see table 1) were produced by injection moulding. The 3 ml containers all had outer diameters of 11.05 mm, inner diameters of 9.25 mm, and thus a wall thickness of 0.90 mm. The containers were closed with a bromobutyl rubber stopper in one end, and a bromobutyl/natural rubber laminate in the other end. The Topas materials produced by Hoechst are build up by bicyclic monomer-elements in combination with ethylene-elements and the CZ-resin from Daikyo is build up by monocyclic monomer elements.

The water permeability in the materials was measured at 3 different conditions. The m-cresol permeability was measured at 37° C. Approximate ethylene content were supplied from the manufacture. Glass transition temperature (Tg) were measured with DSC. Permeability data at 25° C. for Topas 6015 and 6017 are estimated from manufacture data and marked with "*".

TABLE 2

| Materials | Tg °C. | Ethylene content % | Water permeability at 37° C., 13% RH g/m$^2$/24 hours (0.9 mm thick) | Water permeability at 25° C., 13 & RH g/m$^2$/24 hours (0.9 mm thick) | Water permeability at 8° C., 13% RH g/m$^2$/24 hours (0.9 mm thick) | m-cresol permeability at 37° C., 13% RH mg/m$^2$/24 hours (0.9 mm thick) |
|---|---|---|---|---|---|---|
| Topas 8007 | 76 | 65 | 0.10 | 0.40 | 0.011 | <0.1 |
| Topas 5013 | 137 | 55 | 0.14 | 0.62 | 0.019 | <0.1 |
| Topas 6013 | 143 | 55 | 0.14 | 0.60 | 0.018 | <0.1 |
| Topas 6015 | 162 | 45 | NA | 0.70* | NA | NA |
| Topas 6017 | 182 | 40 | NA | 0.90* | NA | NA |
| CZ-resin | 140 | 0 | 0.25 | 0.91 | 0.027 | 0.34 |

As can be seen in table 2, the containers of Topas® 8007, of Topas® 5013 and of Topas® 6013 are all excellent with respect to both transmission and barrier properties.

The sample of Topas® 8007, having a glass transition temperature of 76° C. has a slightly lower permeability than the samples of Topas® 5013 and Topas® 6013, having a higher glass transition temperature of 137 and 143° C., respectively.

The CZ-resin is studied as comparison, the ethylene content of CZ-resin being 0, whereby the cyclic component constitutes 100% of the polymer. The high content of cyclic component impairs the water permeability at all tested temperatures, especially at 8° C. Also the m-cresol barrier properties are reduced compared to the polymers according to the invention.

What is claimed is:

1. A medicament container for storing a liquid medicament comprising one or more active medicaments, water and at least one preservative, the container comprising a distal and a proximal end portion and at least one wall defining an interior space for such liquid medicament, said at least one wall having at least two opposed sections composed of a polymer material, said polymer wall sections having a thickness of between 0.3 mm and 3 mm, a light transmission at 400 nm of 25% or more, measured through both of said opposed container wall sections when the container is filled with water, using a standard spectrophotometer and air as reference, the polymer wall sections being of a material comprising at least 70% by weight of a co-polymer material composed of aliphatic cyclic or bicyclic hydrocarbons with 5 to 7 membered ring or rings, and ethylene or propylene, and wherein the ethylene or propylene is present in the polymer material in an amount of at least 20% of the at least 70%, said wall sections further having a glass transition temperature above 50° C., measured by differential scanning calorimetry, by cutting pieces from the container walls and heating them in an aluminium pan from 10° C. to 270° C. at a scanning rate 10° C./mm, the glass transition temperature being determined as the temperature at the inflection point; and a density of 0.95 g/cm$^3$ or more.

2. A container according to claim 1, wherein said sections are formed of the same material throughout their thickness, and comprise at least 75% by weight of said copolymer material.

3. A container according to claim 1, wherein said sections comprise up to 5% by weight of additives selected from the group of antioxidants, lubricants, surface active agents, and nucleating and clarifying agents, and up to 30% by weight of glass particles having a refractive index of about equal to the refractive index of the polymer material, the total amount of additives and glass particles being up to 30% by weight.

4. A container according to claim 1, wherein the copolymer material is composed of hydrocarbons with cyclic 5 to 7 membered bicyclic rings and ethylene.

5. A container according to claim 1, wherein said sections comprise at least 20% ethylene.

6. A container according to claim 1, wherein the copolymer material is completely amorphous.

7. A container according to claim 1, wherein said sections have a light transmission at 400 nm of 60% or more, measured as defined in claim 1.

8. A container according to claim 1, wherein said sections have a density between 0.95 g/cm$^3$ g/cm$^3$ and 1.05 g/cm$^3$.

9. A container according to claim 1, wherein said sections have a glass transition temperature of at least 75° C.

10. A container according to claim 1, wherein said sections have a glass transition temperature of at most 200° C.

11. A container according to claim 1, wherein said at least one wall which defines said interior space has an inner surface and an outer surface, the inner surface having a substantially cylindrical shape.

12. A container according to claim 1, wherein said at least one wall which defines said interior space has an outer surface having a substantially cylindrical shape.

13. A container according to claim 1, wherein the container is a cartridge, the distal end portion comprising a pierceable seal and the proximal end portion comprising a plunger.

14. A container according to claim 1, wherein said sections constitute at least 30% of the area of the at least one wall.

15. A container according to claim 1, wherein said sections have a permeability of m-cresol of less than 0.0072 g/m$^2$/24 hours, measured after a storing period of three months at 37° C. and 12% RH by contacting the polymer wall with an aqueous 3 mg/ml m-cresol solution, and a permeability of water of less than 0.4 g/m$^2$/24 hours, measured after a storing period of three months at 37° C. and 12% RH.

16. A container according to claim 15, wherein said sections have a permeability of m-cresol of less than 0.0070 g/m$^2$/24 hours, measured after a storing period of three months at 37° C. and 12% RH by contacting the polymer wall with an aqueous 3 mg/ml m-cresol solution.

17. A container according to claim 15, wherein said sections have a permeability of water of less than 0.35 g/m$^2$/24 hours, measured after a storing period of three months at 37° C. and 12% RH.

18. A container according to claim 1, wherein said sections have a permeability of water of less than 0.025 g/m$^2$/24 hours, measured after a storing period of 36 months at 8° C. and 13% RH.

19. A container according to claim 1, at least partly filled with a liquid medicament solution, comprising one or more active medicaments, water and at least one preservative.

20. A medicament container according to claim 14, wherein said sections constitute at least 50% of the area of the at least one wall.

21. A medicament container according to claim 14, wherein said sections constitute at least 80% of the area of the at least one wall.

22. A container according to claim 1, wherein said sections are formed by injection molding.

* * * * *

UNITED STATES PATENT AND TRADEMARK OFFICE
CERTIFICATE OF CORRECTION

PATENT NO. : 6,680,091 B2
APPLICATION NO. : 08/991519
DATED : January 20, 2004
INVENTOR(S) : Thomas Buch-Rasmussen Page 1 of 1

It is certified that error appears in the above-identified patent and that said Letters Patent is hereby corrected as shown below:

On the title page item (74)

Change "Book" to --Bork--

Claim 1

Column 8, Line 33

Change "C./mm" to --C/min--

Claim 8

Column 9, Line 7

Delete "$g/cm^3$" after "$g/cm^3$"

Signed and Sealed this

Eighteenth Day of September, 2007

JON W. DUDAS
*Director of the United States Patent and Trademark Office*

US006680091C1

(12) EX PARTE REEXAMINATION CERTIFICATE (7655th)
United States Patent
Buch-Rasmussen et al.

(10) Number: US 6,680,091 C1
(45) Certificate Issued: Aug. 3, 2010

(54) MEDICAMENT CONTAINER OF POLYMER OF CYCLIC HYDROCARBON FOR STORING A LIQUID MEDICAMENT

(75) Inventors: Thomas Buch-Rasmussen, Gentofte (DK); Patric Jannasch, Roskilde (DK); Erling Bonne Jørgensen, Veksø (DK)

(73) Assignee: Novo Nordisk A/S, Bagsvaerd (DK)

Reexamination Request:
No. 90/009,443, Mar. 31, 2009

Reexamination Certificate for:
Patent No.: 6,680,091
Issued: Jan. 20, 2004
Appl. No.: 08/991,519
Filed: Dec. 16, 1997

Certificate of Correction issued Sep. 18, 2007.

(30) Foreign Application Priority Data

Dec. 23, 1996 (DK) ................................................ 149896

(51) Int. Cl.
*A61J 1/06* (2006.01)
*A61J 1/00* (2006.01)
*C08L 23/00* (2006.01)
*C08L 23/04* (2006.01)
*C08L 23/10* (2006.01)
*C08L 23/12* (2006.01)

(52) U.S. Cl. .................................. 428/35.7; 428/36.92
(58) Field of Classification Search ........................ None
See application file for complete search history.

(56) References Cited

U.S. PATENT DOCUMENTS

| 4,565,851 | A |   | 1/1986  | Barbee          |       |
|-----------|---|---|---------|-----------------|-------|
| 5,506,202 | A | * | 4/1996  | Vertesy et al.  | 514/3 |
| 5,736,207 | A |   | 4/1998  | Walther et al.  |       |
| 5,788,670 | A |   | 8/1998  | Reinhard et al. |       |
| 5,900,285 | A |   | 5/1999  | Walther et al.  |       |
| 6,331,174 | B1 |  | 12/2001 | Reinhard et al. |       |

FOREIGN PATENT DOCUMENTS

| DE | 230 828    | A1 | 12/1985 |
|----|------------|----|---------|
| DE | 251 904    | A3 | 12/1987 |
| DE | 4438359    |    | 10/1994 |
| DE | 4438360    |    | 10/1994 |
| DE | 4445969    |    | 12/1994 |
| EP | 0 559 146  | A1 | 9/1993  |
| JP | 8-155007   |    | 6/1996  |

OTHER PUBLICATIONS

"Topas (COC) Thermoplastic Olefin Polymer of Amorphous Structure", Hoescht High Chem, published in English, Nov. 1995 (hereinafter, Brochure).*
M. Belmares et al., "Hildebrand and Hansen Solubility Parameters from Molecular Dynamics with Application to Electronic Nose Polymer Sensors," *Journal of Computational Chemistry*, vol. 25, No. 15, Wiley InterScience, Jun. 4, 2004, pp. 1814–1826.
Hansen Solubility Parameters—A User's Handbook, Second Edition, CRC Press, taylor & Francis Group, 2007, 9 pages.
David R. Lide, Handbook of Organic Solvents, CRC Press, 1995, 7 pages.
Handbook of Solvents, George Wypych Editor, ChemTec Publishing, 2001, pp. 594–600.
Produktinformationen zu TOPAS®–COC; Cycloolefincopolymeren, Ticona, Aug. 1997.
DIN ISO 13926–1, Sep. 1996; "Pen–systems—Part 1: Glass cylinders for insulin pen–injectors", ist unverändert in diese Detsche Norm übernommen worden.
Wikipedia Encyclopedia keyword "Logical disjunction", printed from http://en.wikipedia.org/wiki/Or_(logic) Oct. 21, 2005.
Neumuller, Otto–Albrecht "Rompps Chemie–Lexikon" Band 2, Franckh'sch Verlagshandlung, Stuttgart 1981, Seite 837–838, Stichword "cyclische Verbindungen".
"Hoechst nutzt Fortschritt in der Katalysatortechnik zur Produktion von neuen High–Tech–Polymeren" VDI–Nachrichten, Nr. 28, Jul. 14, 1995, Seite 12.
Dr. Rainer Weihofen, "TOPAS–der CD–Werkstoff der Zukunft" Informations–dienst Wissenschaft e. V., Sep. 18, 1995.
English language translations of Attachments A and B submitted with Rule 131 Declaration of Thomas Buch–Rasmussen Oct. 1, 2002 in U.S. Appl. No. 08/991,519.
Eidesstattliche Versicherung des Herrn P. Wolbring, Feb. 7, 2005.
DIN ISO 8362; "Injektionsbehaltnisse fur Injektionspraparate und Zubehor—Teil 1: Injektionsflaschen aus Rohrenglas", Dec. 1990.
ISO7886–1, 1993 "Sterile hypodermic syringes for single use—Part 1: Syringes for manual use".
ASTM D1003, 1995, "Standard Test Method for Haze and Luminous Transmittance of Transparent Plastics", pp. 220–224.
DIN ISO 9187, Mar. 1992, "Injection Equipment of Medical Use—Part 1: Ampoules for injectables", ist unverandert in diese Deutsche Norm ubernommen worden.

* cited by examiner

*Primary Examiner*—Stephen J Stein

(57) ABSTRACT

A medicament container for storing a liquid medicament, such as insulin, comprises a wall with at least two opposite portions made of a polymer material having a light transmission at 400 nm of at least 25%, a glass transition temperature above 50° C., and a density of 0.95 g/cm$^3$ or more. The polymer material comprises at least 70% by weight of a copolymer material composed of aliphatic cyclic or bicyclic hydrocarbons with 5 to 7 membered ring or rings and ethylene or propylene. The container is substantially inert to the medicament and, because it is either transparent or at least includes at least two opposed transparent portions, it is possible visually to inspect the contents of the container to make sure that the medicament has not crystalized or polymerized. The walls of the container provide a good barrier against m-cresol/phenol/benzyl alcohol preservatives and water.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 19 is cancelled.

Claim 1 is determined to be patentable as amended.

Claims 2-18 and 20-22, dependent on an amended claim, are determined to be patentable.

New claim 23 is added and determined to be patentable.

1. A medicament container [for storing a liquid medicament comprising one or more active medicaments, water and at least one preservative], the container comprising a distal and a proximal end portion and at least one wall defining an interior space [for such liquid medicament], said at least one wall having at least two opposed sections composed of a polymer material, said polymer wall sections having a thickness of between 0.3 mm and 3 mm, a light transmission at 400 nm of 25% or more, measured through both of said opposed container wall sections when the container is filled with water, using a standard spectrophotometer and air as reference, the polymer wall sections being of a material comprising at least 70% by weight of a co-polymer material composed of aliphatic cyclic or bicyclic hydrocarbons with 5 to 7 membered ring or rings, and ethylene or propylene, and wherein the ethylene or propylene is present in the polymer material in an amount of at least 20% of the at least 70%, said wall sections further having a glass transition temperature above 50° C., measured by differential scanning calorimetry, by cutting pieces form the container walls and heating them in an aluminium pan from 10° C. to 270° C. at a scanning rate 10° C./min, the glass transition temperature being determined as the temperature at the inflection point; and a density of 0.95 g/cm$^3$ or more,

*the interior space of the container being at least partly filled with a liquid medicament solution comprising (a) one or more active medicaments comprising proteins, peptides, and/or DNA sequences; (b) water; and (c) at least one organic preservative for the active medicament.*

23. *A container according to claim 1, wherein the organic preservative is selected from the group consisting of m-cresol, benzyl alcohol, and phenol.*

\* \* \* \* \*

(12) EX PARTE REEXAMINATION CERTIFICATE (8431st)
United States Patent
Buch-Rasmussen et al.

(10) Number: US 6,680,091 C2
(45) Certificate Issued: Jul. 26, 2011

(54) MEDICAMENT CONTAINER OF POLYMER OF CYCLIC HYDROCARBON FOR STORING A LIQUID MEDICAMENT

(75) Inventors: Thomas Buch-Rasmussen, Gentofte (DK); Patric Jannasch, Roskilde (DK); Erling Bonne Jørgensen, Veksø (DK)

(73) Assignee: Novo Nordisk A/S, Bagsvaerd (DK)

Reexamination Request:
No. 90/009,848, Nov. 12, 2010

Reexamination Certificate for:
Patent No.: 6,680,091
Issued: Jan. 20, 2004
Appl. No.: 08/991,519
Filed: Dec. 16, 1997

Reexamination Certificate C1 6,680,091 issued Aug. 3, 2010

Certificate of Correction issued Sep. 18, 2007.

(51) Int. Cl.
*A61J 1/06* (2006.01)
*A61J 1/00* (2006.01)
*C08L 23/00* (2006.01)
*C08L 23/04* (2006.01)
*C08L 23/10* (2006.01)
*C08L 23/12* (2006.01)

(52) U.S. Cl. .................................. 428/35.7; 428/36.92
(58) Field of Classification Search ....................... None
See application file for complete search history.

(56) References Cited

PUBLICATIONS

Topas (COC) Thermoplastic Olefin Polymer of Amorphous Structure, Hoechst High Chem, published in English, Nov. 1995.*
Grant and Hackh's Chemical Dictionary, 5th ed., (1987), p. 220.*
Kirk–Othmer, Encyclopedia of Chemical Technology, vol. 3 and 9 (1978).*

* cited by examiner

*Primary Examiner*—Stephen Stein

(57) ABSTRACT

A medicament container for storing a liquid medicament, such as insulin, comprises a wall with at least two opposite portions made of a polymer material having a light transmission at 400 nm of at least 25%, a glass transition temperature above 50° C., and a density of 0.95 g/cm$^3$ or more. The polymer material comprises at least 70% by weight of a copolymer material composed of aliphatic cyclic or bicyclic hydrocarbons with 5 to 7 membered ring or rings and ethylene or propylene. The container is substantially inert to the medicament and, because it is either transparent or at least includes at least two opposed transparent portions, it is possible visually to inspect the contents of the container to make sure that the medicament has not crystalized or polymerized. The walls of the container provide a good barrier against m-cresol/phenol/benzyl alcohol preservatives and water.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 19 was previously cancelled.

Claim 23 is cancelled.

Claim 1 is determined to be patentable as amended.

Claims 2-18 and 20-22, dependent on an amended claim, are determined to be patentable.

1. A medicament container, the container comprising a distal and a proximal end portion and at least one wall defining an interior space, said at least one wall having at least two opposed sections composed of a polymer material, said polymer wall sections having a thickness of between 0.3 mm and 3 mm, a light transmission at 400 nm of 25% or more, measured through both of said opposed container wall sections when the container is filled with water, using a standard spectrophotometer and air as reference, the polymer wall sections being of a material comprising at least 70% by weight of a co-polymer material composed of aliphatic cyclic or bicyclical hydrocarbons with 5 to 7 membered ring or rings, and ethylene or propylene, and wherein the ethylene or propylene is present in the polymer material in an amount of at least 20% of the at least 70%, said wall sections further having a glass transition temperature above 50° C., measured by differential scanning calorimetry, by cutting pieces [form] *from* the container walls and heating them in an aluminum pan from 10° C. to 270° C. at a scanning rate 10° C./min the glass transition temperature being determined as the temperature at the inflection point; and a density of 0.95 g/cm$^3$ or more, the interior space of the container being at least partly filled with a liquid medicament solution comprising (a) one or more active medicaments comprising proteins, peptides, and/or DNA sequences; (b) water; and (c) at least one organic preservative *selected from the group consisting of m-cresol, benzyl alcohol, and phenol,* for the active medicament.

* * * * *